No. 783,840.

Patented February 28, 1905.

UNITED STATES PATENT OFFICE.

WILLIAM B. KERR, OF MEDFORD, MASSACHUSETTS.

METHOD OF MAKING CULINARY STOCK.

SPECIFICATION forming part of Letters Patent No. 783,840, dated February 28, 1905.

Application filed June 3, 1904. Serial No. 211,048.

*To all whom it may concern:*

Be it known that I, WILLIAM BROWN KERR, a citizen of the United States, and a resident of Medford, in the county of Middlesex and State of Massachusetts, have invented a new and Improved Method of Making Culinary Stock, of which the following is a full, clear, and exact description.

The invention relates to the manufacture of food products; and its object is to provide a new and improved method of making culinary stock, which culinary stock can be readily converted by the consumer into an easily-digested, nourishing, and palatable stew having the flavor of malted oysters, clams, and like bivalves.

The method consists, essentially, in macerating the meat of oysters, clams, or other bivalves by the digestive process, adding malt to the mass, boiling the mixture, and finally concentrating and drying it.

In detail I proceed as follows: One hundred pounds of the meat of oysters, clams, or other bivalves are first passed through a meat-chopper to reduce the meat, to which is now added about twenty-five pounds of water and the mass is warmed to, say, 80° Fahrenheit. To the heated mass is added one-half ounce of papain and one-half ounce pepsin dissolved in two pounds of water, and the resultant mixture is then thoroughly agitated or stirred, say, for about ten minutes, after which the mixture is boiled, preferably by the use of live steam, for one-half hour, so that the original meat of the bivalve is thoroughly macerated and predigested by the digestive process described, the action of the proteolitic ferments (papain and pepsin) being well known, so that further description thereof is not deemed necessary. To the macerated and predigested meat is now added ten pounds of dry coarse malt, and this mixture is now boiled for, say, forty minutes and then the resultant mass is strained and concentrated in a vacuum-pan fitted with a mechanical stirrer until the mass is of a molasses consistence. The mass is then further concentrated, preferably over a water-bath, until the mass becomes lumpy and sufficiently dry to allow of coarsely grinding it. The ground material is now evaporated to complete the dryness over a water-bath, after which five pounds of malted milk is added and the product for commercial reasons is then ground into a fine powder, which forms the culinary stock.

In order to prepare from this culinary stock a stew, the consumer takes, say, a teaspoonful of the stock and places it into a cup or other suitable vessel, then fills the cup with hot water and stirs the contents in the cup for a short time to form a stew which is exceedingly nourishing and easily digestible and palatable and having the flavor of malted oysters, clams, or other bivalves, according to the bivalve meat originally used.

The culinary stock can be readily packed in suitable boxes or other containers and shipped to the consumers and while packed and kept air-tight is not liable to spoil and can be stored for a long time before use.

Having thus described my invention, I claim as new and desire to secure by Letters Patent—

1. The herein-described method for producing a culinary stock, consisting in predigesting the meat of oysters, clams or other bivalves, adding malt to the mass, boiling the resultant mixture, and concentrating and drying it.

2. The herein-described method for producing a culinary stock, consisting in macerating the meat of oysters, clams or other bivalves, predigesting the macerated meat, adding malt to the mass, boiling, concentrating and drying it, adding malted milk, and finally grinding the dry product to powder form.

3. The herein-described method for producing a culinary stock, consisting in reducing the meat of oysters, clams or other bivalves, predigesting the reduced meat, then adding malt to the mass, boiling, concentrating and drying the mass to a molasses consistency, then again concentrating the mass to a lumpy condition, and then coarsely grinding the mass and drying it.

4. The herein-described method for producing a culinary stock, consisting in reducing the meat of oysters, clams or other bivalves, pre-digesting the reduced meat, then adding malt to the mass, boiling, concentrating and drying the mass to a molasses consistency, then again concentrating the mass to a lumpy condition, then coarsly grinding the mass and drying it, then adding malted milk, and finally grinding the resultant mixture to a powder form.

In testimony whereof I have signed my name to this specification in the presence of two subscribing witnesses.

WILLIAM B. KERR.

Witnesses:
ANDREW KERR,
CLOUGH H. KERR.